(No Model.)

O. HARTMANN.
FISHING DEVICE AND SIGNAL.

No. 541,354. Patented June 18, 1895.

Witnesses
P. H. Cagle
L. Douville

Inventor
Oscar Hartmann
By John A. Wiedersheim
Attorney

THE NORRIS PETERS CO., PHOTO-LITHO., WASHINGTON, D. C.

UNITED STATES PATENT OFFICE.

OSCAR HARTMANN, OF PHILADELPHIA, PENNSYLVANIA, ASSIGNOR OF ONE-HALF TO RUDOLPH BECKER, OF SAME PLACE.

FISHING DEVICE AND SIGNAL.

SPECIFICATION forming part of Letters Patent No. 541,354, dated June 18, 1895.

Application filed December 21, 1894. Serial No. 532,561. (No model.)

*To all whom it may concern:*

Be it known that I, OSCAR HARTMANN, a citizen of the United States, residing in the city and county of Philadelphia, State of Pennsylvania, have invented a new and useful Improvement in Fishing Devices and Signals, which improvement is fully set forth in the following specification and accompanying drawings.

My invention consists of a fishing device and signal, embodying an elastic standard having means for clamping a fishing line thereto, and a bell which is sounded or rung when the fish bite, said standard also serving to hook the fish when the line is drawn taut the clamp being double in its nature so as to increase the holding action on the line and adapting the latter to be inserted between the parts of the clamp from above.

It also consists of means for temporarily locking the standard so that when the line is drawn upon by a fish, said standard is released and springs to considerable extent, thus increasing the locking action.

Figures 1, 2, 3:
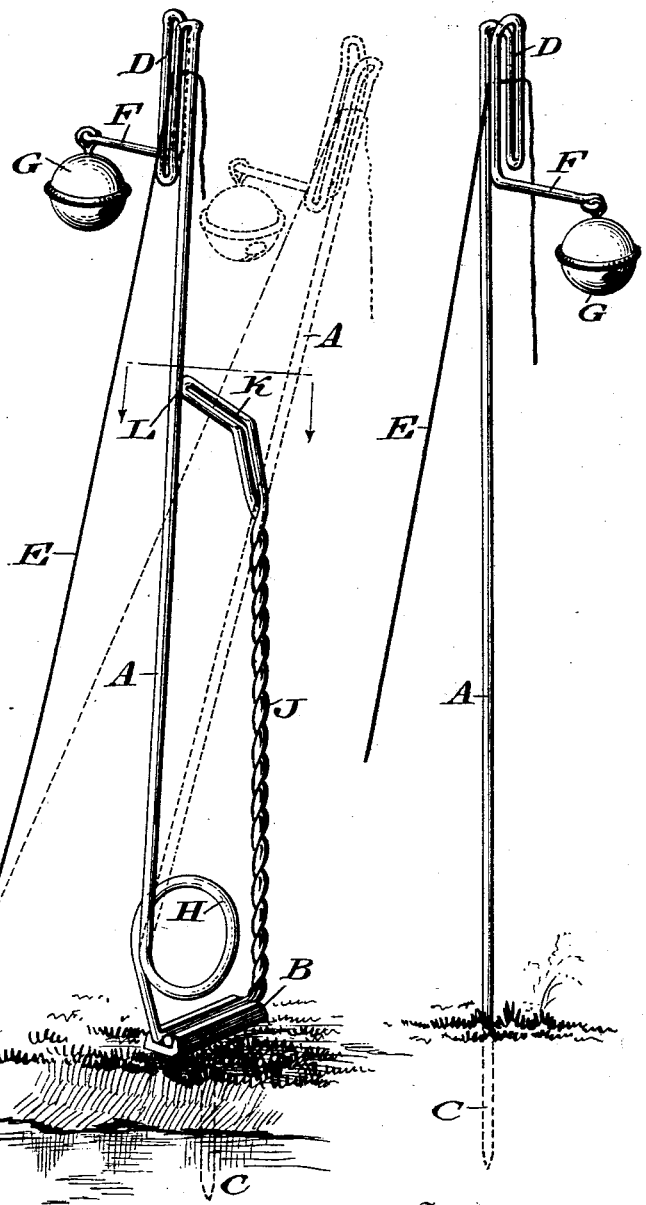
Figure 4:
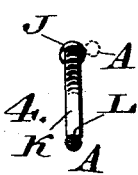

Figures 1, 2, and 3 represent perspective views of a fishing device and signal embodying my invention. Fig. 4 represents a horizontal section on line $x\,x$, Fig. 1.

Similar letters of reference indicate corresponding parts in the several figures.

Referring to the drawings, A designates a standard which is adapted to be driven into the ground, wharf, &c., or be secured to the base B, which has the tooth or prong C thereon for a similar purpose.

The standard in the present case is formed of wire which is elastic in its nature, and has its upper end bent to form the clamp D, which is adapted to hold the end of the fishing line E, said standard having also at its upper end the arm F, which in the present instance is a continuation of the clamp D, said arm carrying the bell G, it being seen that when a fish bites and draws the line sufficiently taut, or jerks the standard, the latter springs so as to hook the fish, and the bell is rung, thus directing attention to the fact that the fish is caught, or at least to the bite.

In order to impart greater resiliency to the standard, the same is formed with the coil H, and an arm J is connected with the lower portion of the standard, or with the base B, its upper end K being turned laterally, and having the groove L in the end thereof for the seating of the adjacent portion of the standard A therein, when said standard is drawn back, it being seen that when the standard is sufficiently pulled or jerked by the bite, it leaves its seat on the arm K, and so springs quickly from its upright position to that shown in dotted lines Figs. 1 and 4, and thereby more effectively hooks the fish while the bell is rung, as is evident.

The clamp D consists of the upper part $D'$ of the standard A the part $D^2$ bent downwardly from the top thereof, the part $D^3$ bent upwardly from the bottom of said part $D^2$ and the part $D^4$ which is bent downwardly from the top of the part $D^3$, thus producing two pairs of parallel jaws, viz—$D'$, $D^4$, and $D^2$, $D^3$, whereby the line will be held at two different places and thus prevented from slipping or being drawn out, and the entrance to the two pairs of jaws is from above so that the line may be inserted into the clamp at the extreme top of the standard, then held near said top whereby the standard is more sensitive to the pull of the line, and the latter may be most conveniently withdrawn from the clamps without anything above the latter obstructing the same, the top of the standard being also vastly strengthened as the jaws brace the same.

Having thus described my invention, what I claim as new, and desire to secure by Letters Patent, is—

1. A fishing device consisting of a wire standard having continuations from the top thereof, respectively downwardly, upwardly and again downwardly forming two pairs of parallel jaws, each of which is open above, said jaws forming a clamp for a line inserted therein, substantially as described.

2. A fishing device consisting of a standard having a coil therein, and a bent upper end, the latter forming a clamp for a line, and provided with an arm supporting an alarm thereon, substantially as described.

3. A fishing device consisting of an elastic standard having a bent upper end forming a clamp for a line, an arm continuous of said clamp supporting an alarm, and a locking arm connected with the base of the standard, having a groove for seating said standard, said parts being combined substantially as described.

OSCAR HARTMANN.

Witnesses:
JOHN A. WIEDERSHEIM,
AUGUST HEYDORN.